United States Patent [19]
Shimada et al.

[11] Patent Number: 5,153,797
[45] Date of Patent: Oct. 6, 1992

[54] HEAD PAD AND PROCESS FOR PRODUCTION OF SAME

[75] Inventors: Minoru Shimada, Chiba; Takashi Fukushima, Tokyo; Akio Kimura, Saitama; Tokio Kanada; Hideyuki Hirano, both of Kanagawa, all of Japan

[73] Assignee: Sony Corporation, Tokyo, Japan

[21] Appl. No.: 687,626

[22] Filed: Apr. 19, 1991

[30] Foreign Application Priority Data

Apr. 20, 1990 [JP] Japan ................... 2-104744

[51] Int. Cl.⁵ .................. G11B 5/60; G11B 17/32
[52] U.S. Cl. ........................................... 360/130.34
[58] Field of Search ..................... 360/102, 130.34

[56] References Cited

U.S. PATENT DOCUMENTS

| 4,998,175 | 3/1991 | Yoshimori et al. | 360/130.34 |
| 5,005,098 | 4/1991 | Kanada | 360/130.34 |
| 5,036,415 | 7/1991 | Nagamori et al. | 360/130.34 |
| 5,047,888 | 9/1991 | Mitsuhashi et al. | 360/130.34 |

Primary Examiner—Robert S. Tupper

[57] ABSTRACT

A head pad having a drawing face which draws a flexible disk used for an electronic still camera, for example, by negative pressure and which is made so that the head, which moves along the radial direction of the disk so as to record or reproduce data on the disk, projects out on the drawing face, wherein said depressions are formed in the drawing face around the head and corner portions of the bottom faces of the depressions are further cut away to form undercut portions, thus facilitating generation of a greater negative pressure between the disk and the pad drawing face and enabling greater improvement of the head touch and enabling greater stabilization of the drawing force of the disk by the pad. Also, a process for production of the above head pad wherein one face of a plate material is polished to form the drawing face and then is etched to form depressions around the head and undercut portions at the corner portions of bottom faces of the depressions, whereby it becomes possible to mass produce high precision pads and it becomes possible to greatly reduce the cost of the manufacture of the pads.

5 Claims, 5 Drawing Sheets

HEAD PAD AND PROCESS FOR PRODUCTION OF SAME

BACKGROUND OF THE INVENTION

1. Field of the Invention

The present invention relates to a head pad made so as to bring a flexible magnetic sheet-like disk able to be used for electronic still cameras, for example, into contact with a magnetic head by negative pressure and to a process for production of the same.

2. description of the Related Art

The recording format of an electronic still camera, for example, is of a short wavelength, so to perform stable magnetic recording or reproduction by a magnetic head, the magnetic head is projected out at the center of a pad (negative pressure type pad) and the flexible magnetic sheet-like disk is rotated while being drawn by to the pad by negative pressure. Explaining this in more detail using FIGS. 1 to 4, reference numeral 1 is a disk-like pad. The top face o the pad 1 forms a drawing face 1a which draws to it a flexible magnetic sheet-like disk A by negative pressure. At the center is formed a rectangular aperture 1a. In the aperture 1b is fixed a magnetic head 2 by an adhesive 3 so as to project out several microns from the drawing face 1a.

The pad 1 with the magnetic head 2 projecting out is made reciprocatively movable in the radial direction of the disk A by a head feed device 4 of a disk drive device shown in FIG. 1. That is, the head feed device 4 substantially includes a head carriage 5 which holds the pad 1, a pair of slide shafts 8a and 8b which are disposed in parallel at a predetermined distance at a top chassis 6a and guide the head carriage 5 to a turntable 7 side of a spindle motor, and a large diameter gear 10 which engages with a small diameter gear 9a of a motor 9 affixed to a bottom chassis 6a, has at its top face a screw-like cam 10a which engages with a pin-shaped cam follower 5a projecting from the bottom face of the head carriage 5, and reciprocatively moves the had carriage 5 in a straight line.

When a disk A is held and rotated at the turntable 7 of the spindle motor, the negative pressure of the air flow created between the disk A and the drawing face 1a of the pad 1 due to the rotation of the disk A (pressure lower than surrounding atmospheric pressure using vicinity of air flow) causes the disk A to turn while being drawn to the drawing face 1a of the pad 1 and thus enabling stable contact to the magnetic head 2.

However, differences in the precision of the flatness of the drawing face 1aof the pad 1 easily result in variations in the negative pressure created between the drawing face 1a and the disk A and therefore there was the problem that a stable head touch could not be obtained at all times.

Further, differences in the state of undulation (flatness) of the disk A during rotation means that the negative pressure fluctuated tremendously, resulting in the disk A being weakly drawn to the magnetic head 2 as shown by the solid line in FIG. 4 or the disk A being strongly drawn to the magnetic head 2 as shown by the dot-chain line, so there was the problem that the spacing loss between the magnetic disk 2 and the disk A ended up increasing and the head touch deteriorated. As a result, it was not possible to stably record/reproduce short wavelengths in the recording format of the electronic still camera.

The assignee disclosed in Japanese Unexamined Patent Application Publication No. 1-315061 the constitution of a head pad which could stably generate negative pressure and improve the head touch by a simple structure. Explaining this using FIG. 5 and FIG. 6 giving the same reference numerals to portions substantially the same as in the construction of the prior art, two annular depressions 1c, 1c having depressions of, for example, 50 to 20 microns, are formed by cutting inside an outside at the peripheral portion of the magnetic head 2 on the drawing face 1a of the pad 1 so as to leave a rib on the drawing face 1a.

If a disk A is inserted to the turntable 7 of the spindle motor in the disk drive device of an electronic still camera using this pad 1 and the disk A is rotated at a high speed by the motor drive of the spindle motor, then the air pressure between the two depressions 1a, 1c of the drawing face 1a of the pad 1 and the disk A will become negative pressure, the disk A will be drawn to the pad 1 side, and the disk A will contact the magnetic head 2 projecting form the pad 1 with a constant contact pressure. At this time, since two depressions 1c, 1c are formed inside and outside around the magnetic head 2 of the drawing face 1a of the pad 1, it is possible to reduce to a indium the variation of the negative pressure occurring between the depressions 1c of the drawing face 1a of the pad 1 and the disk A, regardless of the difference in precision of the flatness of the drawing face 1a of the pad 1 and the undulation etc. of the disk A during rotation and it is possible to increase the drawing force of the magnetic head 2 by the pad 1 to more than in the pad and thus obtain stable contact.

With a pad 1 having so depressions 1c, 1c formed inside and outside around the magnetic head 2 on the drawing face 1a of the above related art, the depressions 1c, 1c enabled negative pressure to be obtained, but the inner circumferential face and outer circumferential face of the portions forming the rib formed between the depressions 1c, 1c (shown by reference numeral 1d in FIG. 6) stood at right angles to the bottom face of the depressions 1c, 1c, so in some cases sufficient negative pressure could not be obtained due to the differences in the machining precision etc. of the components.

Further, securing the surface precision and dimensional precision required in producing the drawing face 1a and the depressions 1c of the pad 1 required rough inspection and quality control. Also, it was difficult and costly to mass produce these with a high precision.

SUMMARY OF THE INVENTION

Therefore, the present invention has as its object the provision of head pad and process for production thereof which enables a much greater increase in the negative pressure drawing force and enables mass production at a high precision at low cost.

To achieve the above object, according to a first aspect of the present invention, there is provided a head pad having a drawing face which draws a disk by negative pressure and which is made so that the head, which moves along the radial direction of the disk so as to record or reproduce data on the disk, projects out on the drawing face, wherein depressions are formed in the drawing face around the head and that the corner portions of the bottom faces of the depressions are further cut away to form uncut portions.

According to a second aspect of the present invention, there is provided a process for production of a head pad wherein one face of a plate material is polished to form the drawing face and then is etched to form depressions around the head and under cut portions at the corner portions of bottom faces of the depressions

BRIEF DESCRIPTION OF THE DRAWINGS

The above object and features of the present invention will be more apparent from the following description of the preferred embodiment with reference to the accompanying drawings, wherein:

FIG. is a schematic plan view of a disk drive device;

FIG. 45 is a plan view of another previous conventional pad;

DESCRIPTION OF THE PREFERRED EMBODIMENT

Figure 1:
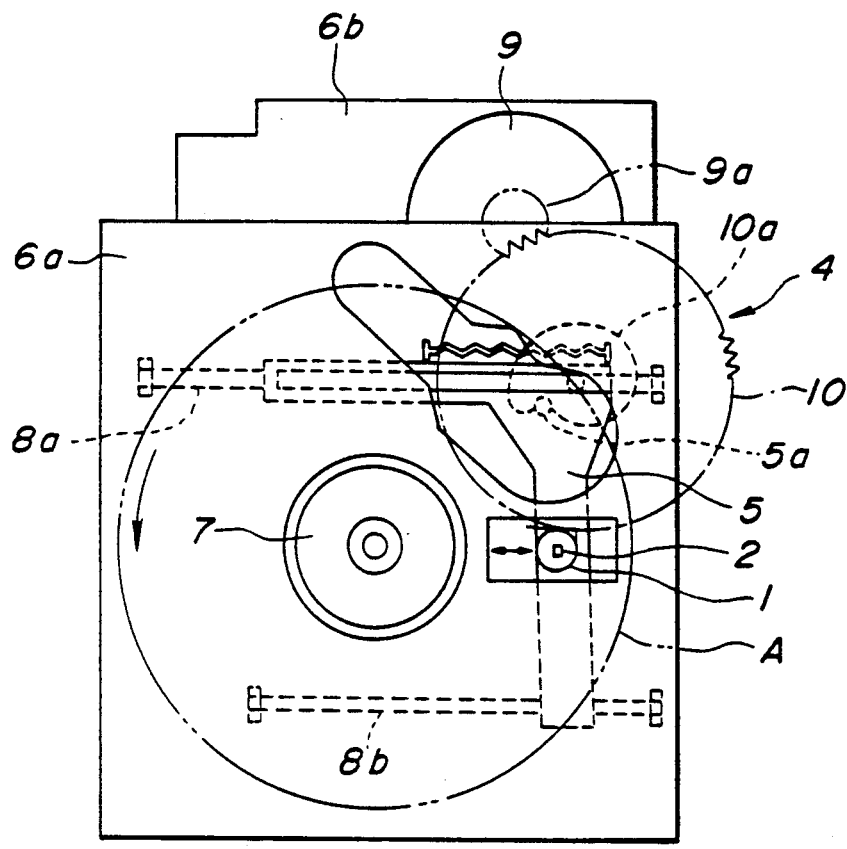
Figure 2:
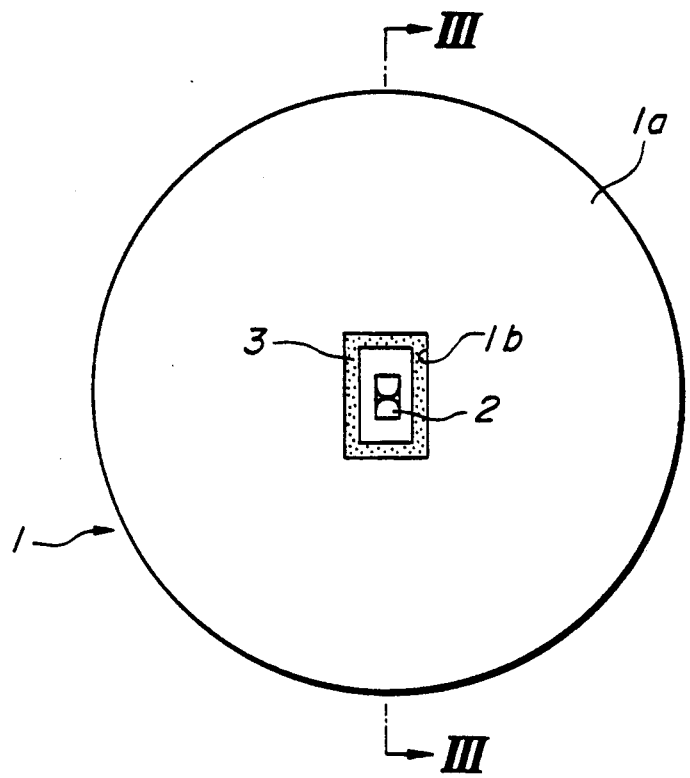
FIG. 2 is a plan view showing a conventional pad.
Figure 3:
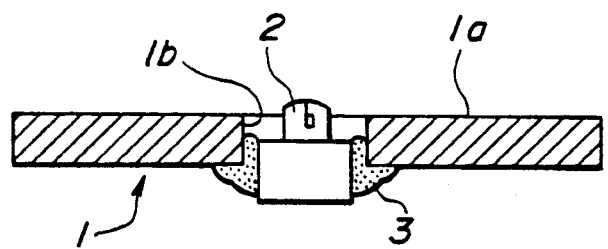
FIG. 3 is a sectional view along line III—III in FIG. 2.
Figure 4:
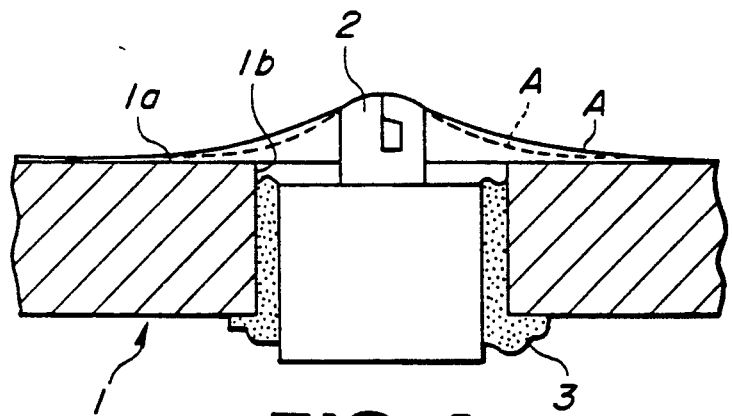
FIG. 4 is a partial, enlarged sectional view of a section of a pad near a head in the related art.
Figure 5:
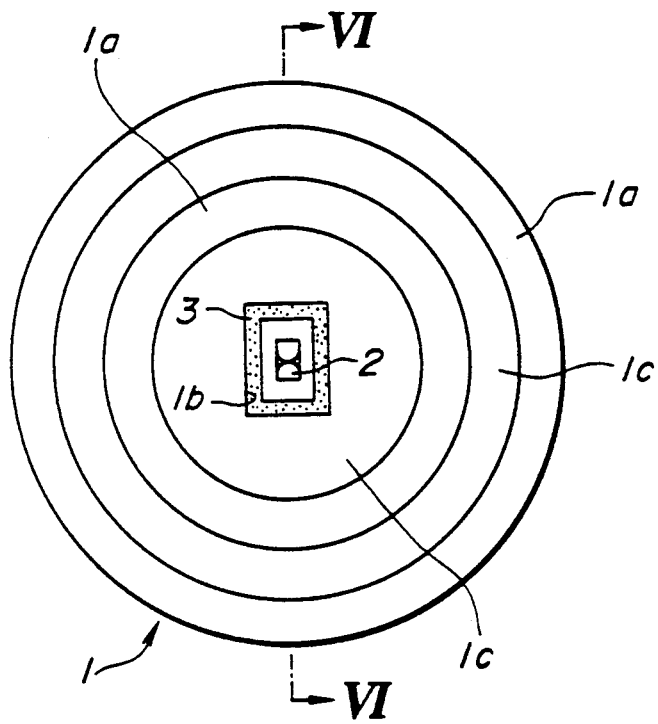
Figure 6:
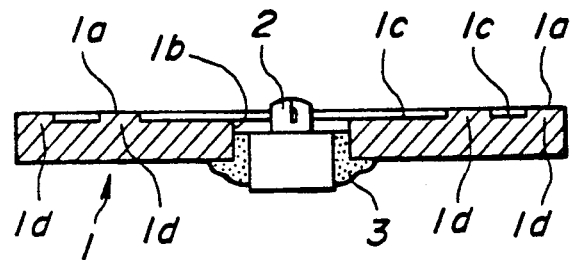
FIG. 6 is a sectional view along line VI—VI in FIG. 5.

The gist of the present invention is as follows: When the disk turns, the air flow accompanying the rotation makes the air pressure between the depressions in the drawing face of the pad and the disk negative. The disk is drawn to the drawing face of the pad and contacts the head projecting from the pad with a certain stable contact pressure. At this time, the under cut portions formed at the corner portions of the bottom faces of the depressions cause the negative pressure to increase more and stabilize the head touch more.

Below, an embodiment of the present invention will be explained based on the drawings. The head feed device 4 used for the electronic still camera of FIG. 1 is adopted here. Further, potions the same as those of the related art are given the same reference numerals in the explanation.

Figure 7:
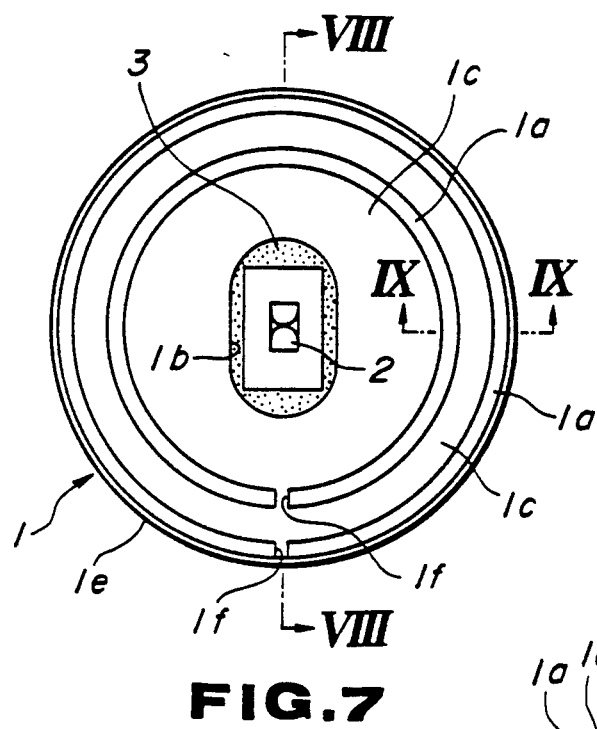
FIG. 7 is a plan view of a head pad showing an embodiment of the present invention.
Figure 8:
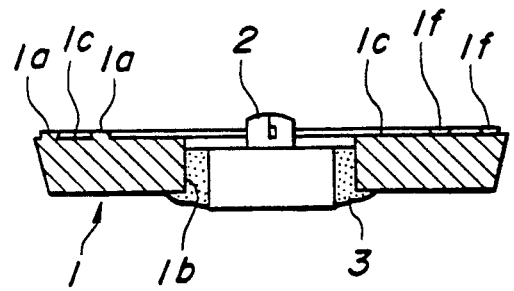
FIG. 8 is a sectional view along line VIII—VIII in FIG. 7.
Figure 9:
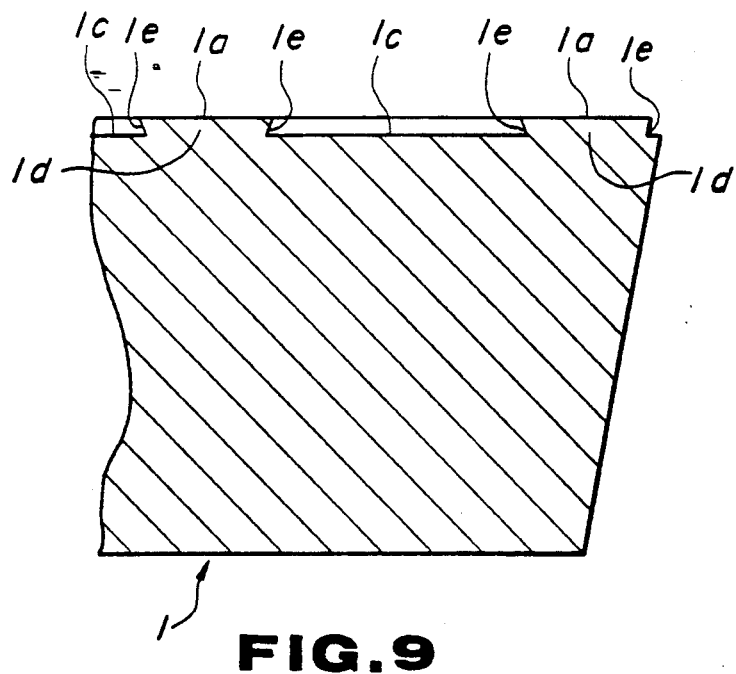
FIG. 9 is an enlarged sectional view along lien IX—IX in FIG. 7.

In FIGS. 7 to 9, reference numeral 1 is a disk-like pad which is fixed to the head carriage 5 of the head feed device 4 by an adhesive etc. The top face of the pad 1 forms a drawing face 1a for a flexible magnetic sheet-like disk A used for the electronic still camera. At the center is formed an aperture 1b of substantially an elliptical shape. In this aperture 1b is affixed by an adhesive 3 a magnetic head 2 protruding at its front portion from the drawing face 1a by, for example, several microns. The adhesive 3 enables a stable negative pressure state to be maintained by preventing air rom leaking from the aperture 1b to the head carriage 5 side.

Further, inside and outside the peripheral portion of the magnetic head 2 on the drawing face 1a of the pad 1 are formed two annular depressions 1i c, 1c having depressions of, for example, 50 to 20 microns, so that the drawing face 1a is left with a rib portion (portion shown by reference d in FIG. 9). The two corner portions of the bottom faces of the depressions 1c, 1c and the outermost peripheral edge of the drawing face 1a are further cut away to from the under cut portions 1e. Further, the downstream side of the drawing face 1a in the direction of rotation (progression) of the disk A has formed on it the cutaway portions 1f, 1f which connect with the depressions 1c, 1c forming the same plane with them. If the amount of the depression of the depressions 1c, 1c is too small, the disk A will end upon drawn to the bottom face of the depressions 1c, 1c, and if the amount of the depression of the depressions 1c, 1c is too large, the negative pressure (absolute value) becomes smaller. As a result of experiments, it was found that the depression should be set to within the above-mentioned range. Further, due to the properties of the fluid, the open air portion easily becomes negative in pressure the greater the change, so by forming under cut portions 1e at the two corner portions of the bottom face of the depressions 1c, 1c and the outermost peripheral edge of the drawing face 1a, greater negative pressure can be easily generated.

Next, an explanation will be made of the process for production of the above pad 1 along with the manufacturing process shown in FIGS. 10(a) to 10(d).

Figure 10:
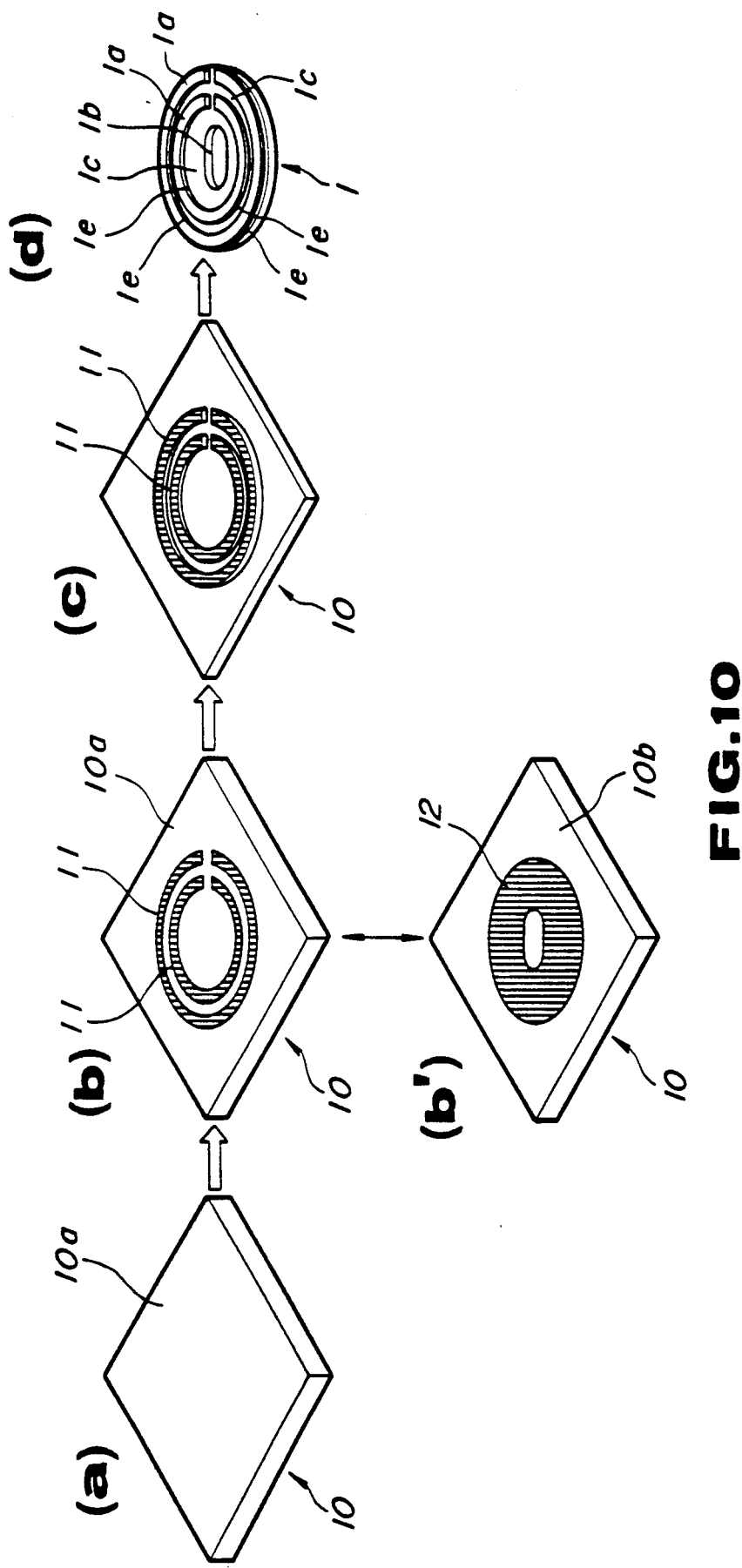
FIGS. 10(a), 10(b), 10(c), and 10(d) are perspective vies showing the manufacturing process for the pad.

First, as shown in FIG. 10(a), the top face 10a of a metal plate material 10 of a square shape, which serves as the pad, is polished by a polisher (electrolytic polishing also acceptable) to give a micro finish (whereby the drawing face 1a of the pad 1 is formed).

Next, as shown in FIG. 10(b), the mirror finished top face 10a of the plate material 10 is given two annular screen printed coatings 11, 11. Further, as shown in FIG. 10(b), the bottom face 10b of the plate material 10 is also given a substantially annular shaped screen printed coating 12 to serve as the bottom face shape of the pad 1 (blank portion inside screen printed portion 12 corresponds to aperture 1b of pad 1).

Next, as shown i FIG. 10(c), the top face 10a side of the plate material 10 is immersed in an enchant and etched to form the drawing faces 1a, 1a projecting out in an annular rib fashion and the bottom face 1b of the plate material 10 is immersed in an etchant and etched to from the aperture 1a of the pad 1 and make the outer shape a disk. All of the plate material 10 may be immersed in the enchant and etched too.

Next, the screen printed coating 11 and 12 are removed, whereupon, as shown in FIG. 10(d), the pad 1 is completed. The The under cut portions 1e of the two corner portions of the bottom faces of the depressions 1c, 1c of the pad 1 and the outermost peripheral edge of the drawing face 1a are easily formed to substantially V-shapes as shown in FIG. 9 by adhesion of the enchant to the circumferential face of the rib 1d potion of the pad 1 during the etching of the top face 10a side of the plate material 10.

According to the pad 1 of the embodiment, if a disk A is mounted to the turntable 7 of the spindle motor in the disk drive device of an electronic still camera and the disk A is rotated at a high speed by the moor drive of the spindle motor, the changes in the flow of air along with the rotation will cause a negative pressure in the air pressure between the two depressions 1c, 1c of the drawing face 1a of the pad 1 and the disk A, the disk A is drawn to the pad 1 side, and the disk A contacts the magnetic head 2 protruding from the pad 1 with a constant contact pressure. At this time, since two depressions 1c, 1c are formed at the inside and outside around the magnetic head 2 of the drawing face 1a of the pad 1 and the undercut portions 1e are formed at the two corner portions of the bottom aces of the depressions 1c,1c and the outermost peripheral edge of the drain face 1a, it is possible to reduce to a minimum the variation in the negative pressure occurring between the depressions 1c of the drawing face 1a of the pad 1 and the disk A and it is possible to increase much more the drawing force of the disk A by the pad 1, that is, the negative pressure, regardless of the differences in precision of the depressions 1c, 1c of the drawing face 1a of the pad 1 and the undulation of the disk A during rotation. As a result, there is no longer any case of the disk A weakly being drawn to the magnetic head 2 during rotation or being strongly drawn to it during rotation and it is possible to reduce to a minimum the spacing loss of the pad 1 and magnetic head 2. By this, the magnetic head 2 is drawn by the pad 1 in a constantly stable state and it is possible to obtain a stabler head touch.

Further, since the downstream side of the drawing face 1a in the direction of rotation (progression) of the disk A has formed on it the cutaway portions 1f, 1f which connect with the depressions 1c, 1c forming the same plane with them, when the disk A is stopped, outside air flows in from the cutaway portions 1d, so the drawing force of the pad 1 can be released. AT the time of starting of the disk A, no unreasonable force acts on the motor 9 for moving the magnetic head 2 or the spindle motor for rotating the disk A and therefore these can be easily started up.

The pad 1 may e processed to a shape facilitating further the generation of the negative pressure by polishing or etching. High precision pads 1 can be mass produced. This enables the manufacture of pads 1 at a low cost.

In this embodiment, the pad 1 is formed in a disk shape, but it is not limited to this and may be any shape, such as a block, so long as a stable head touch can be obtained. Further, the number of depressions is not limited to two and may be three, four, or other numbers. Also, the disk is not limited to use for an electronic still camera and may be applied to anything so long as it uses a flexible disk.

As explained above, according of the present invention, depressions are formed around the head on the drawing face of the pad and the corner portions of the bottom faces of the depressions are further cutaway so as to form undercut portions, so it is possible to increase much more the drawing force of the negative pressure created between the disk and the drawing face of the pad at the undercut portions and therefore it is possible to obtain a stabler head touch.

Further, in the process of production of the above head pad, one face of a plate material is polished to from the drawing face and then is etched to form depressions around the head and undercut portions at the corner portions of the bottom faces of the depressions, so it is possible to mass produce high precision pads and it is possible to reduce costs much more.

We claim:

1. A head pad having a drawing face which draws a disk by negative pressure and which is made so that the head, which moves along the radial direction f the disk so as to record or reproduce data on the disk, projects out on the drawing face, said head pad characterized in that depressions are formed in the drawing face around the head and that the corner portions of the bottom faces of the depressions are further cut away to form undercut portions.

2. A head pad as set forth in claim 1, wherein multiple annular depressions are formed around said head on said drawing face.

3. A head pad as set forth in claim 2, wherein cutaway portions are formed which is on the same plane as the bottom face of the said depressions and connects said depression.

4. A head pad as set forth in claim 1, wherein two annular depressions are formed around said head on said drawing face and undercut portions are provided at the two corner portions of the bottom faces of the depressions and at the outermost peripheral edge side of the drawing face.

5. A head pad as set forth in any one of claims 1 to 4, wherein the amount of depression of the said depressions is made from 50 to 20 microns.

* * * * *